United States Patent
Gong et al.

(10) Patent No.: US 7,654,086 B2
(45) Date of Patent: Feb. 2, 2010

(54) AIR INDUCTION SYSTEM HAVING BYPASS FLOW CONTROL

(75) Inventors: Weidong Gong, Dunlap, IL (US); John D. Goddard, East Peoria, IL (US); Martin L. Willi, Dunlap, IL (US); Scott B. Fiveland, East Norwich, NY (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/169,678

(22) Filed: Jun. 30, 2005

(65) Prior Publication Data

US 2007/0000248 A1    Jan. 4, 2007

(51) Int. Cl.
*F02B 33/44*    (2006.01)
*F02B 37/16*    (2006.01)
*F02B 37/12*    (2006.01)

(52) U.S. Cl. ...................................... 60/611

(58) Field of Classification Search ................ 60/611, 60/600, 601; 123/559.1, 564
See application file for complete search history.

(56) References Cited

U.S. PATENT DOCUMENTS

| | | | | |
|---|---|---|---|---|
| 3,421,314 A | * | 1/1969 | Reinhard | 60/611 |
| 4,466,414 A | * | 8/1984 | Yoshimura et al. | 123/564 |
| 4,512,153 A | * | 4/1985 | Kawabata et al. | 60/611 |
| 4,515,136 A | * | 5/1985 | Cholvin et al. | 123/564 |
| 4,566,422 A | * | 1/1986 | Tadokoro et al. | 123/559.1 |
| 4,870,822 A | * | 10/1989 | Kamimaru | 60/611 |
| 5,155,999 A | * | 10/1992 | Hashimoto et al. | 60/611 |
| 5,694,899 A | * | 12/1997 | Chvatal et al. | 60/611 |
| 5,806,490 A | * | 9/1998 | Nogi et al. | 123/435 |
| 6,134,888 A | | 10/2000 | Zimmer et al. | 60/600 |
| 6,318,085 B1 | | 11/2001 | Torno et al. | 60/611 |
| 6,510,840 B2 | | 1/2003 | Tadashi | 123/399 |
| 6,675,579 B1 | * | 1/2004 | Yang | 60/611 |
| 6,990,814 B2 | * | 1/2006 | Boley et al. | 60/611 |
| 7,487,639 B2 | * | 2/2009 | Hofstetter | 60/611 |
| 2004/0006985 A1 | | 1/2004 | Wild et al. | 60/611 |
| 2009/0077968 A1 | * | 3/2009 | Sun | 60/605.2 |
| 2009/0114003 A1 | * | 5/2009 | Wegener et al. | 73/114.79 |

FOREIGN PATENT DOCUMENTS

| | | | | |
|---|---|---|---|---|
| DE | 3512557 A1 | * | 10/1985 | 60/611 |
| DE | 19609230 A1 | * | 9/1997 | |
| EP | 1 435 445 | | 7/2004 | |
| EP | 1 548 250 | | 6/2005 | |
| FR | 2557636 A1 | * | 7/1985 | 60/611 |
| FR | 2560289 A1 | * | 8/1985 | 60/611 |
| GB | 2163483 A | * | 2/1986 | |
| JP | 58018532 A | * | 2/1983 | 60/611 |
| JP | 61201833 A | * | 9/1986 | |
| JP | 2006299923 A | * | 11/2006 | |

* cited by examiner

*Primary Examiner*—Thai Ba Trieu
(74) *Attorney, Agent, or Firm*—Finnegan, Henderson, Farabow, Garrett & Dunner

(57) ABSTRACT

An air induction system for an engine is disclosed. The air induction system has a compressor operable to compress air directed into the engine, a bypass valve, and a throttle valve. The bypass valve may be disposed between the compressor and the engine and may have a valve element movable to selectively divert a portion of the compressed air away from the engine in response to a desired air-to-fuel ratio of the engine. The throttle valve may be disposed between the bypass valve and the engine and may have a valve element movable to selectively restrict the flow of compressed air into the engine in response to a desired air-to-fuel ratio of the engine. The movements of the valve elements of the bypass and throttle valves may be substantially sequential.

22 Claims, 1 Drawing Sheet

AIR INDUCTION SYSTEM HAVING BYPASS FLOW CONTROL

TECHNICAL FIELD

The present disclosure relates generally to an air induction system and, more particularly, to an air induction system having bypass flow control.

BACKGROUND

Internal combustion engines such as, for example, gasoline engines combust a mixture of air and fuel to produce a power output. The amount of air and fuel and the ratio of air-to-fuel introduced into a combustion chamber of the engine can affect the power output, efficiency, and exhaust emissions of the engine. Typically, the amount of air introduced into the engine and the ratio of air-to-fuel is controlled by a throttle valve mechanism. The throttle valve mechanism selectively restricts the flow of air into the engine to a flow rate that corresponds to a desired ratio of air-to-fuel. However, by restricting the flow of air into the combustion chamber of the engine, the efficiency of the engine may be reduced. In particular, when the throttle valve is in a flow-restricting position, the engine may have to work harder (e.g., expel additional energy) to draw or pump in the same amount of air as compared to when the throttle valve is in a non-restricting position. This additional work output of the engine decreases the efficiency of the engine.

One attempt to improve the efficiency of an engine has been described in U.S. Pat. No. 6,134,888 (the '888 patent) issued to Zimmer et al. on Oct. 24, 2000. The '888 patent describes an engine having a throttle and an electronic turbocharger control system with a wastegate and a bypass valve. The throttle is disposed between a compressor of a turbocharger and an intake manifold to create a pressure differential. The wastegate is disposed between an engine exhaust duct and a turbine of the turbocharger to divert exhaust gases from the turbine to an exhaust discharge duct, thereby decreasing compressor discharge pressure. The bypass valve is disposed between the compressor and the throttle to connect a compressor discharge duct with the engine exhaust discharge duct, thereby relieving pressure in the compressor discharge duct.

To obtain optimum engine efficiency, the throttle of the '888 patent is maintained in an open position to avoid blocking energy in the form of airflow into the engine. Compressor discharge pressure may be controlled by adjusting a position of the wastegate and the bypass valve. By controlling the compressor discharge pressure, the throttle can be opened to a greater angle, thereby obtaining greater engine efficiency by reducing an exhaust back pressure associated with higher compressor discharger pressures. This increase in throttle angle also reduces energy loss across the throttle, thereby increasing engine efficiency.

Although the system of the '888 patent may increase the efficiency of an engine, it may be complex, expensive, and still lack optimal efficiency. In particular, because the system of the '888 patent requires both a compressor bypass and a wastegate, control of the system may be complicated and component cost of the system substantial. In addition, because the bypass diverts compressed air to the turbine, the energy of the compressed air may either be wasted to the atmosphere via the wastegate, or wastefully directed to driving the turbine for compressing more air. Further, although the wastegate and bypass valve of the electronic turbocharger control system may decrease the amount of restriction associated with the throttle, the throttle of the '888 system is still used throughout the operating range of the engine to inefficiently regulate the flow of air into the engine.

The disclosed air induction system is directed to overcoming one or more of the problems set forth above.

SUMMARY OF THE INVENTION

In one aspect, the present disclosure is related to an air induction system for an engine. The air induction system includes a compressor operable to compress air directed into the engine, a bypass valve, and a throttle valve. The bypass valve is disposed between the compressor and the engine and has a valve element movable to selectively divert a portion of the flow of the compressed air away from the engine in response to a desired air-to-fuel ratio of the engine. The throttle valve is disposed between the bypass valve and the engine and has a valve element movable to selectively restrict the flow of compressed air into the engine in response to a desired air-to-fuel ratio of the engine. Movements of the valve elements of the bypass and throttle valves are substantially sequential.

In another aspect, the present disclosure is directed to a method of regulating the flow of intake air through an engine. The method includes rotating a compressor to compress a flow of intake air. The method also includes selectively diverting at least a portion of the compressed air away from the engine in response to an air-to-fuel ratio of the engine and selectively restricting the flow of compressed air into the engine in response to the air-to-fuel ratio of the engine.

The steps of selectively diverting and selectively restricting are initiated substantially sequentially.

DETAILED DESCRIPTION

Figure 1:
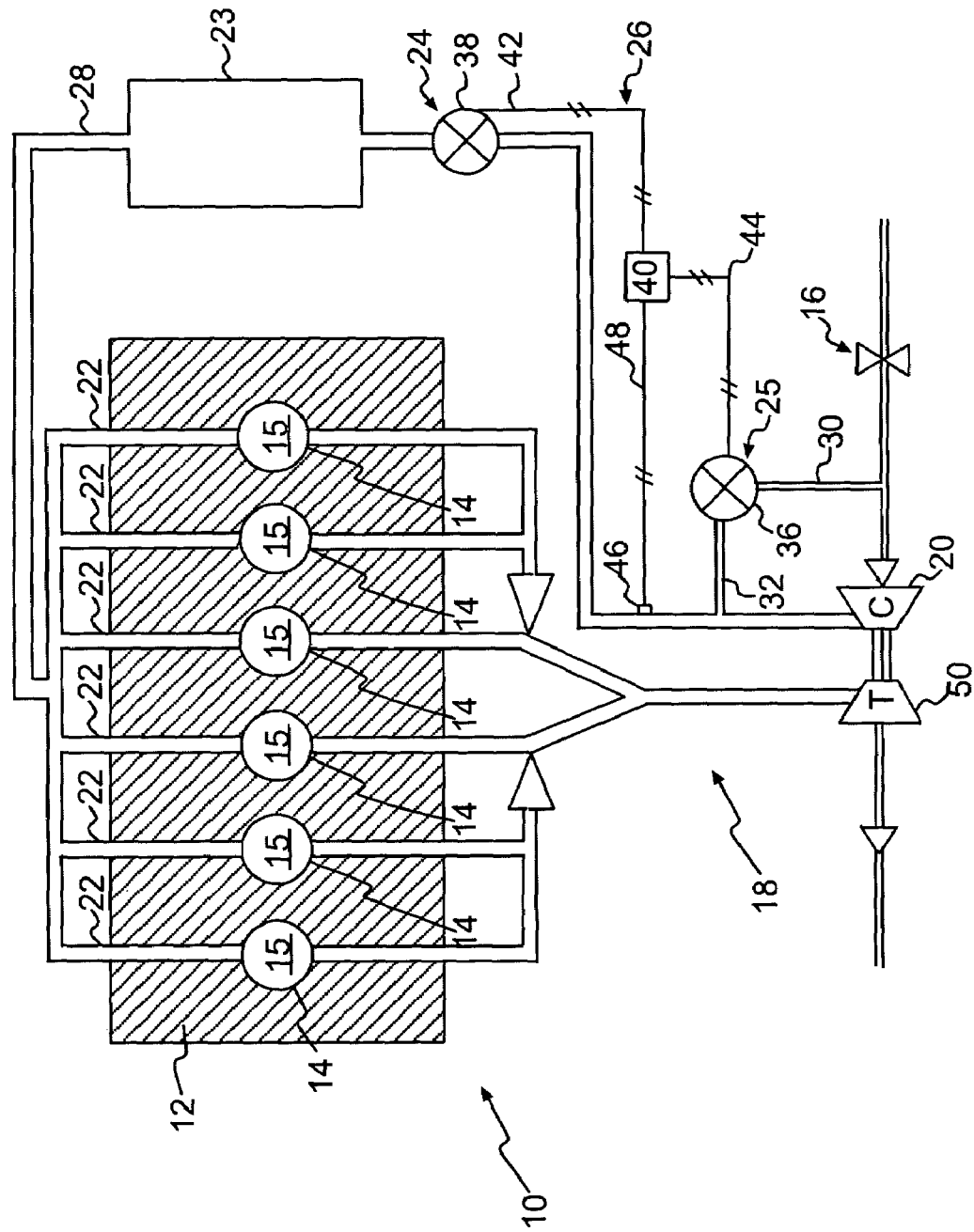
FIG. 1 is a diagrammatic illustration of an exemplary disclosed engine.

FIG. 1 illustrates an exemplary disclosed engine 10 having multiple components that cooperate to produce a power output. In particular, engine 10 may include an engine block 12 that defines a plurality of cylinders 14, a piston (not shown) slidably disposed within each cylinder 14, and a cylinder head (not shown) associated with each cylinder 14. It is contemplated that engine 10 may include additional or different components such as, for example, a valve mechanism associated with each cylinder head, one or more fuel injectors, and other components known in the art. For the purposes of this disclosure, engine 10 is depicted and described as a four-stroke gasoline engine. One skilled in the art will recognize, however, that engine 10 may embody any other type of internal combustion engine such as, for example, a gaseous fuel-powered engine.

The piston, cylinder head, and cylinder 14 may form a combustion chamber 15. In the illustrated embodiment, engine 10 includes six combustion chambers 15. However, it is contemplated that engine 10 may include a greater or lesser number of combustion chambers 15 and that the combustion chambers 15 may be disposed in an "in-line" configuration, a "V" configuration, or any other suitable configuration.

As also shown in FIG. 1, engine 10 may include a plurality of systems that facilitate production of the power output. In particular, engine 10 may include an air induction system 16 and an exhaust system 18. It is contemplated that engine 10 may include additional systems such as, for example, a fuel system, a lubrication system, a transmission system, a cooling system, and other such engine systems that are known in the art.

Air induction system 16 may include a means for introducing charged air into combustion chambers 15 of engine 10. For example, air induction system 16 may include a compressor 20 in fluid communication with one or more inlet ports 22 of each cylinder head, an air cooler 23, a bypass valve 25, a throttle valve 24, and a control system 26. It is contemplated that additional and/or different components may be included within air induction system 16 such as, for example, an air cleaner and other means known in the art for introducing charged air into combustion chambers 15.

Compressor 20 may be configured to compress the air flowing into engine 10 to a predetermined pressure level and to direct the compressed air to inlet ports 22 via a fluid conduit 28. Compressor 20 may embody a fixed geometry compressor, a variable geometry compressor, or any other type of compressor known in the art. It is contemplated that multiple compressors 20 may alternatively be included within air induction system 16 and disposed in a series or parallel relationship, if desired.

Air cooler 23 may embody an air-to-air heat exchanger or an air-to-liquid heat exchanger in fluid communication with fluid conduit 28. Air cooler 23 may be configured to transfer heat to or from the air compressed by compressors 20, prior to the compressed air entering combustion chambers 15 of engine 10. For example, air cooler 23 may include a tube and shell type heat exchanger, a plate type heat exchanger, or any other type of heat exchanger known in the art.

Bypass valve 25 may be fluidly connected to fluid conduit 28 at a point upstream of compressor 20 via a fluid conduit 30 and at a point down stream of compressor 20 via a fluid conduit 32. Bypass valve 25 may include a valve element 36 movable to control the amount of compressed air delivered to combustion chambers 15. In particular, valve element 36 may be movable from a flow blocking position, at which substantially all of the compressed air from compressor 20 is directed to engine 10, against a spring bias toward a flow-passing position, at which a portion of the compressed air from compressor 20 is diverted from engine 10 at the point downstream of compressor 20 to the point upstream of compressor 20 via fluid conduits 30, 32. Bypass valve 25 may include a butterfly valve element, a spool valve element, a shutter valve element, a check valve element, a diaphragm valve element, a gate valve element, a shuttle valve element, a ball valve element, a globe valve element, or any other type of valve element known in the art.

Throttle valve 24 may be located within fluid conduit 28 and between compressor 20 and inlet ports 22 to control the amount of air delivered to combustion chambers 15. Throttle valve 24 may be positioned at any suitable location within fluid conduit 28 such as, for example, before or after air cooler 23. Throttle valve 24 may include a valve element 38 movable from a flow-passing position against a spring bias toward a flow-restricting position. When in the flow-passing position, atmospheric air may be directed into engine 10 substantially unrestricted. The term restricted, for the purposes of this disclosure, is to be interpreted as at least partially blocked from fluid flow. It is also contemplated that valve element 38, when in the flow-restricting position, may be fully blocked from fluid flow. Throttle valve 24 may include a butterfly valve element, a spool valve element, a shutter valve element, a check valve element, a diaphragm valve element, a gate valve element, a shuttle valve element, a ball valve element, a globe valve element, or any other type of valve element known in the art.

Control system 26 may be configured to affect operation of one or both of throttle and bypass valves 24, 25 in response to one or more input. In particular, control system 26 may include a controller 40 that communicates with throttle valve 24 by way of a communication line 42, with bypass valve 25 by way of a communication line 44, and with a sensor 46 by way of a communication line 48.

Controller 40 may embody a single microprocessor or multiple microprocessors that include a means for controlling an operation of air induction system 16. Numerous commercially available microprocessors can be configured to perform the functions of controller 40. It should be appreciated that controller 40 could readily embody a general engine microprocessor capable of controlling numerous engine functions. Controller 40 may include all the components required to run an application such as, for example, a memory, a secondary storage device, and a processor, such as a central processing unit or any other means known in the art for controlling throttle and bypass valves 24, 25. Various other known circuits may be associated with controller 40, including power supply circuitry, signal-conditioning circuitry, solenoid driver circuitry, communication circuitry, and other appropriate circuitry.

Controller 40 may be configured to regulate an actual air flow characteristic of the compressed air directed to combustion chambers 15 based on a desired air flow characteristic and input from sensor 46. In particular, controller 40 may be configured to receive an indication of a desired air flow characteristic such as, for example, a desired air-to-fuel ratio, a desired air pressure, a desired flow rate, or any other appropriate characteristic. Controller 40 may be further configured to compare the desired air flow characteristic to the input from sensor 46 and initiate movement of valve elements 36 and 38 in response to the comparison. For example, if an increase in air flow rate, pressure, and/or air-to-fuel ratio is desired, valve element 36 of bypass valve 25 may be moved to minimize the amount of air diverted from downstream of compressor 20 to the point upstream of compressor 20. By minimizing the amount of air diverted away from engine 10, the flow rate of air directed from compressor 20 to inlet ports 22 may increase, resulting in an increased air-to-fuel ratio. Similarly, valve element 38 of throttle valve 24 may be moved to a flow-passing position to decrease a restriction on the amount of air directed from compressor 20 to inlet ports 22. Conversely, if a decrease in the air flow, pressure, and/or air-to-fuel ratio is desired, valve element 36 may be moved to increase the amount of air diverted away from engine 10. Likewise, valve element 38 of throttle valve 24 may be moved to the flow-restricting position to increase the restriction on the compressed air flow and reduce the flow rate, pressure, and resulting in a decreased air-to-fuel ratio.

Controller 40 may move valve elements 36 and 38 sequentially according to a current loading condition of engine 10 to accommodate a desired change of the air flow characteristic. Specifically, controller 40 may operate bypass valve 25 to control the air flow characteristic of engine 10 during a high load condition and throttle valve 24 to control the air flow characteristic of engine 10 during a low load condition. For example, when engine 10 is operating at load above about 25% of a rated load (e.g., at a high load) and a decrease in the air flow characteristic is desired, valve element 36 of bypass valve 25 may be moved to divert an increased amount of air away from engine 10 and back into compressor 20. At this time, valve element 38 of throttle valve 24 may initially remain stationary in the fully open and non-restricting position. As the load on engine 10 falls below about 25% of the rated load (e.g., to a low load), valve element 36 may reach the fully open and flow diverting position. In this situation, some portion of the compressed air from compressor 20 may still be directed to inlet ports 22 of engine 10. In order to further reduce the air flow, pressure, and resulting air-to-fuel ratio after valve element 36 is in the fully open position, valve element 38 of throttle valve 24 may then be moved toward the flow-restricting position. Conversely, when starting from the low load condition, only valve element 38 of throttle valve 24 may initially move to increase the flow rate, pressure, and resulting air-to-fuel ratio. After the engine load has increased to about 25% of the rated load, valve element 38 may be in the fully open position or non-restricting position and movement of valve element 36 may be initiated to reduce the diverting of compressed air from compressor 20 back to the inlet of compressor 20.

Sensor 46 may embody a monitoring device configured to monitor a characteristic of the compressed air directed from compressor 20 to engine 10. For example, sensor 46 may embody a flow meter, a pressure sensor, a viscosity sensor, a temperature sensor, or any other appropriate monitoring device. Sensor 46 may be configured to generate a signal indicative of the monitored characteristic, and to transmit the signal to controller 40 via communication line 48. Sensor 46 may be in fluid communication with fluid conduit 28 at any point between compressor 20 and combustion chambers 15.

Exhaust system 18 may include a means for directing exhaust flow out of engine 10. For example, exhaust system 18 may include a turbine 50 connected to receive exhaust from engine 10. It is contemplated that exhaust system 18 may include additional and/or different components such as, for example, emission controlling devices such as particulate traps, NOx absorbers, or other catalytic devices, attenuation devices, and other means known in the art for directing exhaust flow out of engine 10.

Turbine 50 may be connected to drive compressor 20. In particular, as the hot exhaust gases exiting engine 10 expand against blades (not shown) of turbine 50, turbine 50 may rotate and drive compressor 20. It is contemplated that more than one turbine 50 may alternatively be included within exhaust system 18 and disposed in a parallel or series relationship, if desired. It is also contemplated that turbine 50 may be omitted and compressor 20 driven by engine 10 mechanically, hydraulically, electrically, or in any other manner known in the art, if desired.

INDUSTRIAL APPLICABILITY

The disclosed air induction system may be used in any power system where efficient control of an inlet air flow characteristic is desired. In particular, the disclosed system provides a simple, reliable way to control a characteristic of intake air while minimizing inefficient restriction of the incoming air and the associated exhaust backpressure. The operation of air induction system 16 will now be described.

Atmospheric air may be drawn into air induction system 16 via compressor 20 where it may be pressurized to a predetermined level before entering combustion chamber 15 of engine 10. Fuel may be mixed with the pressurized air before or after entering combustion chamber 15. This fuel-air mixture may then be combusted by engine 10 to produce mechanical work and an exhaust flow. The exhaust flow may be directed from engine 10 to turbine 50 where the expansion of hot exhaust gases may cause turbine 50 to rotate, thereby rotating connected compressor 20 to compress the inlet air. After exiting turbine 50, the exhaust gas flow may be directed to the atmosphere.

In response to desired and monitored air flow characteristics, controller 40 may operate throttle and bypass valves 24, 25 to control the flow rate of the air entering engine 10, and the resulting air-to-fuel ratio. As described above, during a high load condition (e.g., a load above about 25% of the rated load), only valve element 36 of bypass valve 25 may be moved to change the characteristics of the compressed air directed to engine 10. Similarly, during a low load condition (e.g., a load less than about 25% of the rated load), only valve element 38 of throttle valve 24 may be moved to change the characteristics of the compressed air directed to engine 10.

The strategy implemented by controller 40 to regulate the air flow characteristics of engine 10 may result in improved efficiency of engine 10. In particular, because valve element 38 of throttle valve 24 may remain in the non-restricting position for about 75% of the operational range of engine 10, the efficiency losses associated with air flow restriction may be minimal as compared to a system that operates a throttle valve throughout a larger portion of the engine's operational range.

The configuration and location of bypass valve 25 may also increase the efficiency of engine 10. Specifically, because bypass valve 25 diverts air flow to the inlet of compressor 20 rather than to turbine 50 or to the atmosphere, pumping losses associated with the unnecessary operation of turbine 50 and wastegating may be reduced or even eliminated.

It will be apparent to those skilled in the art that various modifications and variations can be made to the disclosed air induction system without departing from the scope of the disclosure. Other embodiments of the air induction system will be apparent to those skilled in the art from consideration of the specification and practice of the air induction system disclosed herein. It is intended that the specification and examples be considered as exemplary only, with a true scope of the disclosure being indicated by the following claims and their equivalents.

What is claimed is:

1. A method of regulating the flow of intake air through an engine, the method comprising:
    operating a compressor to compress a flow of intake air;
    opening a first valve to selectively and independently divert an increasing portion of the compressed air away from the engine while the compressed air entering the engine is substantially unrestricted by a second valve; and
    operating the second valve to selectively and independently increase a restriction on the flow of compressed air into the engine while the first valve is held open at a maximum flow-passing position,
    wherein operating the first valve and opening the second valve are performed sequentially.

2. The method of claim 1, wherein the step of operating the second valve is initiated after the step of operating the first valve has been initiated.

3. The method of claim 1, wherein the step of operating the first valve is performed during a high load condition and the step of operating the second valve is performed during a low load condition.

4. The method of claim 3, wherein the low load condition includes a load less than about 25% of a rated load.

5. The method of claim 1, further including:
    sensing a characteristic of the compressed air;
    generating a signal indicative of the characteristic; and
    controlling at least one of the first and second valves in response to the signal.

6. The method of claim 1, wherein selectively diverting includes selectively diverting the portion of the compressed air from the compressor back into the compressor.

7. The method of claim 1, further including, after selectively and independently restricting the flow of compressed air, cooling the air flowing toward the engine.

8. An air induction system for an engine, comprising:
    a means for compressing air and directing the compressed air into the engine;
    a means for diverting a portion of the flow of compressed air away from the engine; and
    a means for restricting the flow of compressed air into the engine, wherein:

during a first range of engine conditions, the means for diverting is moved to a maximum flow-diverting condition before the means for restricting is used to restrict the flow of compressed air into the engine;

during a second range of engine conditions, the means for restricting is moved to a minimum flow-restricting before initiating a movement of the means for diverting toward a flow-blocking position; and only one of the means for diverting and means for restricting is moved at a time during operation in the first and second ranges of engine conditions.

9. The air induction system of claim 8, wherein the means for restricting is configured to regulate the flow of compressed air through the engine during a low load condition while the means for diverting is held in a flow-passing position.

10. The air induction system of claim 9, wherein the low load condition includes a load less than about 25% of a rated load.

11. The air induction system of claim 8, further including:
a means for monitoring a characteristic of the compressed air and for generating a signal indicative of the characteristic; and
a means for controlling the means for diverting and the means for restricting in response to the signal.

12. The air induction system of claim 8, wherein the means for diverting is further configured to selectively divert the portion of the compressed air from the means for compressing back into the means for compressing.

13. An air induction system for an engine, comprising:
a compressor operable to compress air directed into the engine;
a fluid conduit fluidly connecting at least the compressor and the engine;
a bypass valve positioned to fluidly connect at least a point downstream of the compressor to a point upstream of the compressor, the bypass valve having a valve element independently movable to selectively divert a portion of the flow of compressed air away from the engine; and
a throttle valve positioned on the fluid conduit, the throttle valve having a valve element independently movable to selectively restrict the flow of compressed air into the engine; and
a controller in communication with the bypass valve and the throttle valve, the controller being configured to:
during a first range of engine conditions, open the bypass valve to a maximum flow-passing position before initiating a closing movement of the throttle valve that increases a flow restriction through the throttle valve; and
during a second range of engine conditions, open the throttle valve to a maximum flow-passing position before initiating a closing movement of the bypass valve that decreases flow through the bypass valve to the engine,
wherein only one of the bypass and throttle valves is moved at a time during the first and second ranges of engine conditions.

14. The air induction system of claim 1, wherein the controller is configured to regulate the flow of compressed air through the engine during a low load condition by moving the throttle valve while the bypass valve is held in a flow-passing position.

15. The air induction system of claim 14, wherein the low load condition includes a load less than about 25% of a rated load.

16. The air induction system of claim 1, further including:
a sensor configured to generate a signal indicative of a characteristic of the compressed air, wherein
the controller is in communication with the sensor and at least one of the bypass and throttle valves is controlled in response to the signal.

17. The air induction system of claim 1, wherein the bypass valve is configured to selectively divert the portion of the compressed air from the compressor back into the compressor.

18. The air induction system of claim 1, further including an air cooler positioned between the throttle valve and the engine.

19. A power system, comprising:
an engine configured to produce a power output;
an air induction system configured to direct compressed air into the engine, the air induction system comprising:
a compressor operable to compress the air directed into the engine;
a bypass valve positioned to fluidly connect at least a point downstream of the compressor to a point upstream of the compressor, the bypass valve having a valve element independently movable to selectively divert a portion of the compressed air from the compressor back into the compressor;
a throttle valve positioned on the fluid conduit, the throttle valve having a valve element independently movable to selectively restrict the flow of compressed air into the engine; and
a controller in communication with the bypass valve and the throttle valve, the controller being configured to:
during a first range of engine conditions, open the bypass valve to a maximum flow-passing position before initiating a closing movement of the throttle valve that increases a flow restriction through the throttle valve; and
during a second range of engine conditions, open the throttle valve to a maximum flow-passing position before initiating a closing movement of the bypass valve that decreases flow through the bypass valve to the engine,
wherein only one of the bypass and throttle valves is moved at a time during the first and second ranges of engine conditions.

20. The power system of claim 19, wherein:
the controller is configured to regulate the flow of compressed air through the engine during a low load condition by moving the throttle valve while the bypass valve is held in a flow-passing position.

21. The power system of claim 20, wherein the low load condition includes a load less than about 25% of a rated load.

22. The power system of claim 21, wherein the air induction system further includes:
a sensor configured to generate a signal indicative of a characteristic of the compressed air, wherein the controller is in communication with the sensor and at least one of the bypass and throttle valves is controlled in response to the signal.

* * * * *

UNITED STATES PATENT AND TRADEMARK OFFICE
CERTIFICATE OF CORRECTION

| | | |
|---|---|---|
| PATENT NO. | : 7,654,086 B2 | Page 1 of 1 |
| APPLICATION NO. | : 11/169678 | |
| DATED | : February 2, 2010 | |
| INVENTOR(S) | : Gong et al. | |

It is certified that error appears in the above-identified patent and that said Letters Patent is hereby corrected as shown below:

Please correct the Specification as follows:
Column 2, lines 31-32, delete "The steps of... ... ... ...substantially sequentially." and insert the same after "engine." on Column 2, line 30, as a continuation of the above paragraph.

Please correct the Claims as follows:
Column 7, line 59, in claim 14, delete "claim 1," and insert -- claim 13, --.

Column 8, line 4, in claim 16, delete "claim 1," and insert -- claim 13, --.

Column 8, line 10, in claim 17, delete "claim 1," and insert -- claim 13, --.

Column 8, line 14, in claim 18, delete "claim 1," and insert -- claim 13, --.

Signed and Sealed this

Twenty-second Day of June, 2010

David J. Kappos
*Director of the United States Patent and Trademark Office*